United States Patent
Merkel et al.

(10) Patent No.: US 9,058,523 B2
(45) Date of Patent: Jun. 16, 2015

(54) MASKING MODULE FOR A VIDEO SURVEILLANCE SYSTEM, METHOD FOR MASKING SELECTED OBJECTS, AND COMPUTER PROGRAM

(75) Inventors: Marcel Merkel, Oberengstringen (CH); Hartmut Loos, Hildesheim (DE); Jan Karl Warzelhan, Bad Salzdefurth Ot Heinde (DE)

(73) Assignee: Robert Bosch GmbH, Stuttgart (DE)

( * ) Notice: Subject to any disclaimer, the term of this patent is extended or adjusted under 35 U.S.C. 154(b) by 913 days.

(21) Appl. No.: 12/864,289

(22) PCT Filed: Nov. 11, 2008

(86) PCT No.: PCT/EP2008/065305
§ 371 (c)(1),
(2), (4) Date: Jul. 23, 2010

(87) PCT Pub. No.: WO2009/095106
PCT Pub. Date: Aug. 6, 2009

(65) Prior Publication Data
US 2010/0328460 A1 Dec. 30, 2010

(30) Foreign Application Priority Data
Feb. 1, 2008 (DE) .......................... 10 2008 007 199

(51) Int. Cl.
*H04N 7/18* (2006.01)
*G06K 9/00* (2006.01)
*G08B 13/196* (2006.01)

(52) U.S. Cl.
CPC ...... *G06K 9/00771* (2013.01); *G08B 13/19652* (2013.01); *G08B 13/19686* (2013.01)

(58) Field of Classification Search
CPC ..... G06K 9/32; G06K 9/2054; G06K 9/6292; G06K 9/00624; G06K 9/00771; G08B 13/19608; G08B 13/19626; G08B 13/19663; G08B 13/19641; G08B 13/19652; G08B 13/19686; G08B 13/19693

USPC .................. 348/143, 148, 151–153, 155, 159
See application file for complete search history.

(56) References Cited

U.S. PATENT DOCUMENTS

| 6,509,926 B1 * | 1/2003 | Mills et al. ..................... 348/143 |
| 7,161,615 B2 * | 1/2007 | Pretzer et al. .................. 348/143 |

(Continued)

FOREIGN PATENT DOCUMENTS

| DE | 10 2007 029 606 | 1/2009 |
| JP | 2005-286468 | 10/2005 |

(Continued)

OTHER PUBLICATIONS

Fredric Dufaux et al: "Smart Video Surveillance System . . . " Proceedings of the SPIE, SPIE, Bellingham, VA, US, vol. 5685., Mar. 1, 2005, pp. 54-63, XP002430633.

*Primary Examiner* — Emmanuel L Moise
*Assistant Examiner* — Farzana Huq
(74) *Attorney, Agent, or Firm* — Michael J. Striker

(57) ABSTRACT

In addition to the clear advantages of video monitoring systems for securing monitoring regions and optionally for following suspicious objects, there is the requirement to secure the private environments of people in the regions being monitored. A masking module (4) for a monitoring system (1) is disclosed for the above, wherein the monitoring system (1) has at least one monitoring camera (2) designed and/or arranged for observing monitoring regions with moving objects (14, 16), comprising a selection device for selecting objects as selected objects (16), wherein the masking module (4) is designed to output the selected objects (16) or partial regions thereof subsequently together called selected objects (16) in a masked form, wherein the masking module (4) is designed to limit the masking of objects (16) to at least one selected physical partial region (15, 18) of the monitoring region.

13 Claims, 3 Drawing Sheets

(56) References Cited

U.S. PATENT DOCUMENTS

| | | |
|---|---|---|
| 7,408,546 B2 * | 8/2008 | Serra .............................. 345/419 |
| 7,447,332 B2 * | 11/2008 | Horii et al. .................... 382/103 |
| 7,801,328 B2 | 9/2010 | Au et al. |
| 8,427,538 B2 * | 4/2013 | Ahiska .......................... 348/143 |
| 2003/0103139 A1 * | 6/2003 | Pretzer et al. ................. 348/143 |
| 2003/0227555 A1 * | 12/2003 | Kobayashi et al. ........ 348/231.6 |
| 2004/0032494 A1 * | 2/2004 | Ito et al. ........................ 348/152 |
| 2004/0119819 A1 * | 6/2004 | Aggarwal et al. ............. 348/143 |
| 2005/0123172 A1 | 6/2005 | Henson |
| 2005/0129272 A1 | 6/2005 | Rottman |
| 2005/0180595 A1 | 8/2005 | Horii et al. |
| 2006/0187237 A1 * | 8/2006 | Park .............................. 345/625 |
| 2007/0115356 A1 * | 5/2007 | Kang et al. .................... 348/143 |
| 2007/0116328 A1 | 5/2007 | Sablak et al. |
| 2008/0158361 A1 * | 7/2008 | Itoh et al. ...................... 348/155 |
| 2009/0015670 A1 * | 1/2009 | Gopinath et al. ............. 348/143 |
| 2010/0002070 A1 * | 1/2010 | Ahiska ............................ 348/36 |
| 2011/0317012 A1 * | 12/2011 | Hammadou .................. 348/143 |

FOREIGN PATENT DOCUMENTS

| | | |
|---|---|---|
| JP | 2007-243509 | 9/2007 |
| WO | 01/62006 | 8/2001 |
| WO | 2006/070249 | 7/2006 |
| WO | 2006/104903 | 10/2006 |

* cited by examiner

MASKING MODULE FOR A VIDEO SURVEILLANCE SYSTEM, METHOD FOR MASKING SELECTED OBJECTS, AND COMPUTER PROGRAM

BACKGROUND INFORMATION

The invention relates to a masking module for a surveillance system, wherein the surveillance system includes at least one surveillance camera and is suitable and/or situated for observing surveillance regions containing moving objects, comprising a selection device for selecting objects as selected objects, wherein the masking module is designed to output selected objects or subregions thereof—which are referred to below in totality as selected objects—in a masked form. The invention furthermore relates to a corresponding method for masking selected objects, and a computer program.

Video surveillance systems usually include a plurality of surveillance cameras which are directed to surveillance regions and depict the surveillance regions as surveillance scenes. Video surveillance systems are used e.g. in plants or companies, and in public places, intersections, train stations, or other buildings. The streams of image data from the surveillance cameras are often combined in a surveillance center, where they are stored or evaluated manually or in an automated manner.

In addition to the obvious advantages of video surveillance systems of that type for ensuring safety in surveillance regions and, optionally, for tracking suspicious objects, it is a challenge, however, to protect the privacy of persons in areas under video surveillance. Privacy must be protected for any number of reasons. For example, it may be uncomfortable for pedestrians to be under constant, trackable surveillance by all possible video surveillance systems. There is also the issue of data security and of storing personal data when pedestrians are randomly recorded and their images are permanently stored.

To adequately respect privacy, surveillance cameras are typically positioned such that only relevant surveillance regions are observed and recorded. Another possibility is to use physical structures to shield regions that should be protected, e.g. by shielding view, or to hide regions when configuring the cameras, in which case a detailed region of the camera image is simply hidden or blacked out.

Publication US 2007/0116328 A1 discloses a method for masking bare skin in recorded video images, with the goal of meeting society's expectations on decency. The regions of bare skin are detected by analyzing the content of the video image and are then hidden using a mask.

Publication US 2005/0129272 A1, which is the closest prior art, discloses a video surveillance system that incorporates object masking, wherein a processor identifies at least one object in a surveillance scene, which is then visually masked using a color mask or the like. The object is identified by evaluating a color distribution, a geometric shape, a dependence of a first geometric shape on a second geometric shape, a grayscale value, or information on texture.

DISCLOSURE OF THE INVENTION

The invention relates to a masking module having the features of claim 1, a method for masking selected objects having the features of claim 11, and to a computer program having the features of claim 12. Advantageous and/or preferred embodiments of the invention are disclosed in the dependent claims, the description that follows, and the attached figures.

The masking module is preferably realized either as an auxiliary device or an integrated component of a surveillance system. A surveillance system having the masking module is therefore likewise disclosed within the scope of the invention. The surveillance system includes at least one surveillance camera which may be of any type, such as a color camera, a black-and-white camera, an infrared PTZ (pan-tilt-zoom) camera, or the like. The surveillance system is suitable and/or situated for observing surveillance regions containing moving objects.

The masking module includes a selection device for selecting objects as the selected objects. The moving objects are preferably detected in the surveillance scene(s) initially using known image-processing algorithms, and can be tracked if necessary. These detected and/or tracked objects are subsequently identified as selected objects, in particular in accordance with specified rules.

Furthermore, the masking module is designed to output selected objects or subregions thereof—which are referred to below in totality as selected objects—in a masked form. According to a preferred application of the invention, the selected objects are the objects to be protected, that is, moving objects whose privacy should be protected by masking. The masking is preferably carried out by covering or distorting the selected object, or by using any other method for rendering the selected object unrecognizable. According to one possible embodiment, the only objects that are masked are exclusively the selected objects; in another embodiment, all moving objects are masked initially, then the masking is removed from objects that are a complement of the set of the selected objects.

Within the scope of the invention it is provided that the masking module is designed to limit the masking to objects in at least one selected or selectable spacial subregion. In other words, the selected objects are selected preferentially on the basis of their membership in the selected spacial subregion. Therefore, when the masking module is initialized, one or more spacial subregions in the surveillance region is/are selected, and then only those objects are masked that are situated in the selected spacial region.

One consideration of the invention is that the techniques used so far to limit the masking to defined image regions or specified features have the deficiency that they do not utilize any knowledge of the video-monitored surveillance region or the moving objects and their behavior. As a distinction from the known prior art, in the case of the masking module according to the invention, knowledge of the surveillance region, in particular its spacial layout, or knowledge of the behavior of the objects is utilized to control a masking or demasking of objects. The knowledge can be supplied, as advance knowledge, to the masking module; as an alternative, the knowledge is acquired or updated by the masking module or the surveillance system.

The invention is preferably designed or implemented using digital image processing. In modified embodiments, the invention can also be realized using analog image processing and/or by mixing analog and digital image processing.

The invention has the advantage that the privacy of non-participants can be protected very exactly and even selectively. Furthermore, the invention advantageously helps to ensure that public spaces are protected. In a particularly advantageous manner, the invention therefore helps to markedly increase the acceptance of installing cameras for video surveillance.

In a preferred embodiment of the invention, the masking module is designed to define the selected subregion depending on a distance from the surveillance camera. In this embodiment, it is possible e.g. to separate different regions, such as private and public regions, from each other using a dividing line, wherein only objects from one of the regions are output in a masked form. It is possible e.g. to use existing dividing lines such as fences or property lines for the initialization. It is likewise possible to select flat regions having any type of outline as the subregion.

In a supplementary or alternative embodiment, the masking module includes a depth chart device having a depth chart, wherein the spacial subregion is selected from or using the depth chart. In a preferred embodiment, a depth chart contains information on how the ground or background of the surveillance scene depicted in the video image actually extends in three dimensions. In this manner, it is possible e.g. to assign a spacial position in the surveillance region to persons, that is, extended objects, using the depth chart on the basis of their foot point in the video image, and to mask or demask these persons as specified. The depth chart can be entered manually, created using calibration methods when the surveillance system is initialized, or it can be learned during operation of the surveillance system or the masking module.

In a preferred realization, the spacial subregions and/or a graph of the distance are/is entered manually. This information can be input e.g. using a human-machine interface that is designed as a computer mouse or the like.

In another possible supplementation of the invention, the selected spacial subregion is designed as a 3D object or a subsection thereof. This embodiment makes it possible to remove extended objects, in particular stationary objects, in the surveillance region from surveillance by masking moving objects situated therein. A 3D object of this type can be designed e.g. as a building occupied by private individuals.

In one possible implementation of the invention, the masking module includes a model device that has a 3D model of the surveillance scene, wherein the spacial region and/or the 3D object that forms the selected region is ascertained on the basis of the 3D model. The 3D module preferably includes images of the stationary objects in the surveillance region. The 3D module can be created in a manner analogous to the creation of the depth chart.

In a preferred embodiment of the invention, the masking module includes a masking device that is designed to mask objects. Depending on the embodiment of the invention, the masking device can be designed to exclusively mask the selected objects, or to mask all moving objects.

In one development of the invention, the marking module also includes a demasking device that is designed to remove the masking from a subset of the masked objects.

A demasking device of this type can be used to advantage when the selected objects have been masked, but this masking must then be removed for certain reasons. In one possible embodiment of the invention, the demasking can be performed manually, that is, a user can demask masked objects that have been selectively identified. In an alternative embodiment, masked objects are demasked automatically, and the demasking is carried out on the basis of specifiable conditions. One possible condition is the object behavior of the masked object. If the object behavior corresponds to a specifiable pattern of behavior, such as loitering, moving against a specified direction of motion (e.g. driving in the wrong direction on a one-way street), moving at a certain speed (e.g. moving faster than a predetermined maximum speed), accelerating the object past a predetermined limit of acceleration (e.g. the object runs away or falls), the position of the masked object, etc., then the masking is removed.

According to another embodiment or a supplementary embodiment of the demasking device, all moving objects in the surveillance region are initially masked, and the demasking device is designed to demask all masked objects that do not belong to the selected objects. This embodiment has the advantage that, to ensure that privacy is protected, all detected objects are initially protected using masking, wherein the masking is removed only if certain conditions exist.

In a preferred realization of the invention, the masking device is designed to perform key-protected encoding of the objects to be masked in the stream of image data itself. In the masking process, a reversible encoding is therefore employed that is enabled only by applying a key that functions in a selective manner, preferably for each individual object.

A key is preferably understood to be an authorization tool that is digital, for example. The key can have any bit length e.g. a bit length greater than 8 bits, preferably greater than 32 bits, and in particular greater than 64 bits. For example, the key can be analog, or it can be designed similar to a pgp key. According to a preferred embodiment, the encoding-decoding can be achieved using symmetrical and/or asymmetrical encryption. In particular, the contents are coded using a symmetrical encryption or key, and the key is transferred to the user with asymmetrical encryption.

In a development of the invention, it is provided that the keys to the key-protected encoding are not accessible to the user, but rather are automatically destroyed or deactivated after a certain period of time. Furthermore, it is preferable for keys to be released by the objects to be demasked. Preferably, the masking module includes a key memory that is designed to generate keys and/or to store keys temporarily or permanently.

The invention furthermore relates to a method for masking moving objects in a video surveillance region, wherein the masking is carried out only for moving objects in a selected spacial subregion of the video surveillance region, which forms a subregion of the surveillance region.

The invention furthermore relates to a computer program for implementing the method.

BRIEF DESCRIPTION OF THE DRAWINGS

Further features, advantages, and effects of the present invention result from the description that follows of a preferred embodiment of the invention, and from the attached figures. They show.

EMBODIMENT(S) OF THE INVENTION

Figure 1:
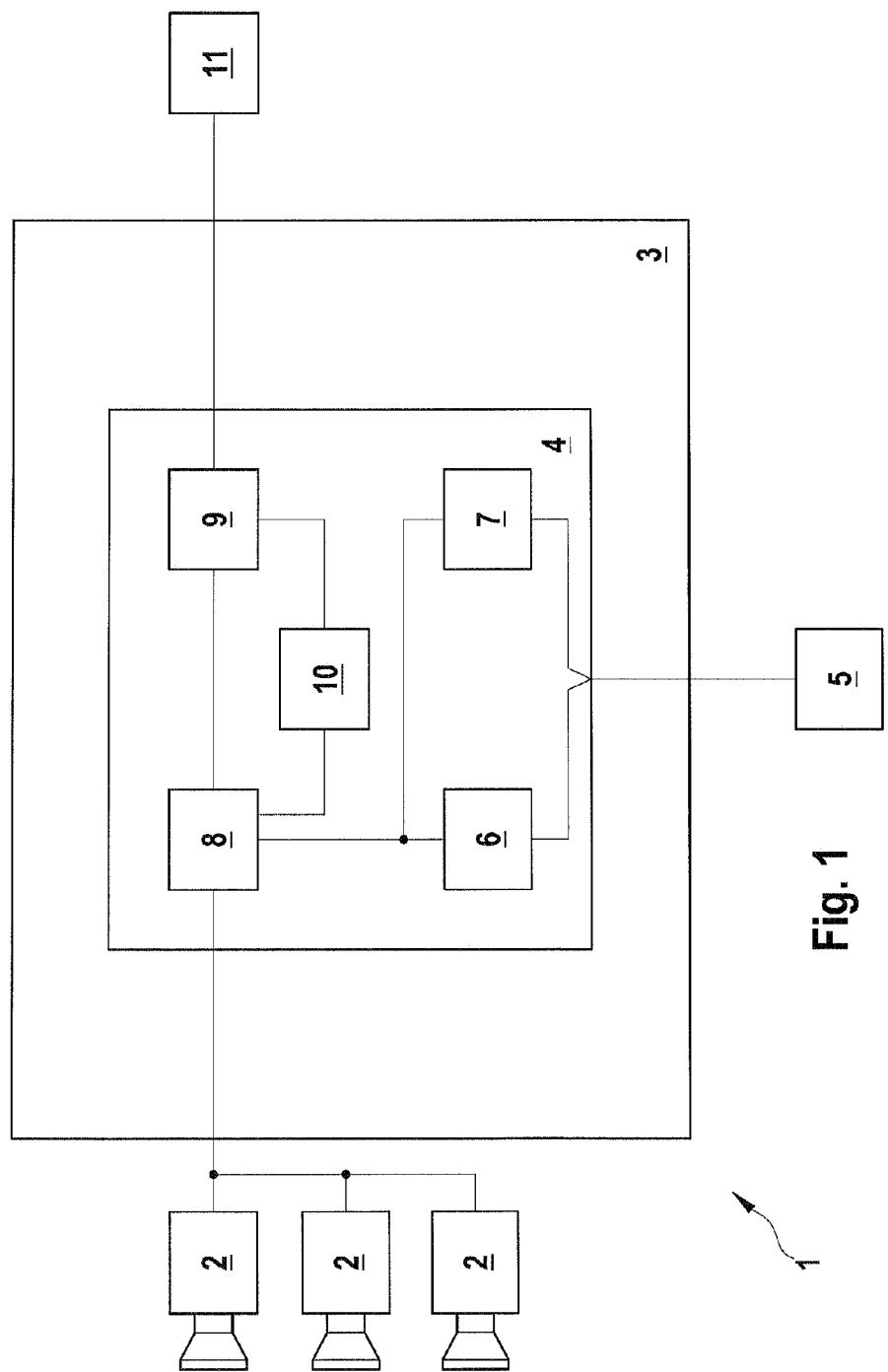
FIG. 1 a block diagram of a surveillance system having a masking module, as a first embodiment of the invention.

FIG. 1 shows a schematic block diagram of a video surveillance system 1 which includes a plurality of surveillance cameras 2 that are directed to a surveillance scene for monitoring purposes. Surveillance cameras 2 can be designed e.g. as PTZ (pan-tilt-zoom) cameras in camera networks that can observe an entire 3D environment. The stream of image data recorded by surveillance cameras 2 is sent to a central unit 3 of surveillance system 1.

In addition to optional further known modules, central unit 3 includes a masking module 4 that implements the task of protecting privacy in subregions of the surveillance regions by rendering persons, or moving objects in general, as the selected objects, unrecognizable and/or unidentifiable using digital image-processing algorithms and/or analog image processing.

To define the spacial subregions in which the moving objects should be rendered unrecognizable using masking, which are referred to below as masking regions, masking module 4 is connected to a human-machine interface 5 that permits a user to select the masking regions.

A first possibility for performing the selection is to define the masking regions on the basis of depth charts or depth information in a depth chart device 6, wherein objects are masked that move at a defined distance from surveillance camera 2 or within a distance range in the surveillance region. For example, persons or license plates of automobiles that move outside of company property, or that move outside of a store, past the window, etc., are masked to protect their privacy.

A second possibility is to use a model device 7 that provides a 3D model of the surveillance region. In this possibility, extended 3D regions of the surveillance region, such as buildings or building sections, can be selected as masking regions. For example, persons in a building who are detected behind windows are anonymized. However, persons who move in front of the building, for instance, are not anonymized.

After the spacial marking regions are defined in the surveillance regions, moving objects that are detected in the masking region are output to masking module 4 in a masked form. According to an alternative embodiment, masking module 4 or parts thereof can also be situated decentrally in surveillance cameras 2, thereby ensuring that surveillance cameras 2 only output image data streams that contain masked objects.

Masking is carried out in a masking device 8, preferably in the image data stream from video surveillance cameras 2 before the image data stream is stored, in order to ensure the maximum level of privacy protection. A demasking device 8 is installed downstream of masking device 8, which enables masked objects to be demasked under certain conditions which will be described below. Masking is carried out in masking device 8 preferably using key-protected encoding of the particular image regions, wherein the key(s) of the key-protected encoding is/are stored in key memory 10. The key or keys must be used to demask the masked objects in demasking device 9. Preferably, every masked object receives an individual key.

One condition for the demasking is that the moving object exhibit abnormal or unusual behavior, for instance. In this case, the moving object loses its right to privacy, and the masking is removed.

In another mode of operation, all moving objects are initially masked in marking device 8, and then, in demasking module 9, all masked objects that do not belong to the selected objects and/or that are objects exhibiting unusual motion are demasked.

Preferably, keys that are not used directly in demasking device 9 are destroyed in key memory 10. The image data stream containing the unmasked, masked, and/or partially demasked objects is finally output in a known manner via an interface 11, and is displayed to surveillance personnel, for example.

Figure 2:
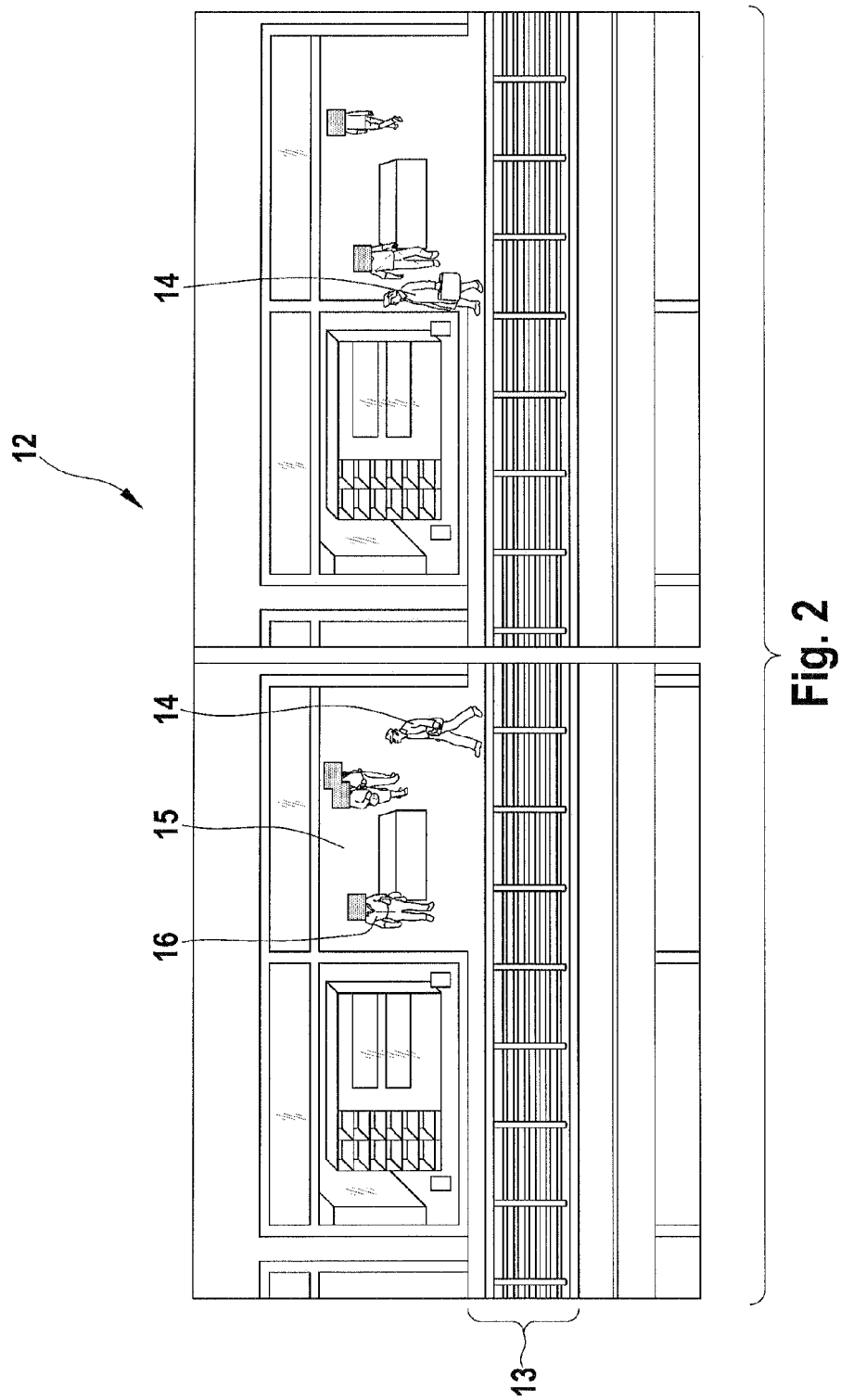
FIG. 2 a first exemplary scene to illustrate the mode of operation of the surveillance system depicted in FIG. 1.

FIG. 2 shows a surveillance scene, as an example, for the use of masking module 4. A shopping center 12 is depicted in the surveillance scene, wherein a surveillance camera is directed toward publicly accessible regions 13 containing pedestrians 14 in front of stores, and simultaneously records private interior spaces 15 of stores containing persons 16. While pedestrians 14 in the public region are not provided with privacy protection, persons 16 in the stores do have privacy protection.

To select interior spaces 15 as masking regions, the store can be selected as a 3D object in modeling device 7 and identified as a masking region. It is also possible to generate a masking region, using depth chart device 6, based on a distance to the camera that extends on the boundary line between public region 13 and business region 14. As shown in FIG. 2, persons 16 in the masking region are masked using a black rectangle. If masked persons 16 exhibit unusual behavior, it is possible for demasking device 9 to remove the masking. However, pedestrians 14 in front of the businesses are not masked, or are no longer masked. The reverse case is also possible, of course, in which public region 13 is selected as the masking region, and interior spaces 15 are selected as demasking regions.

Figure 3:
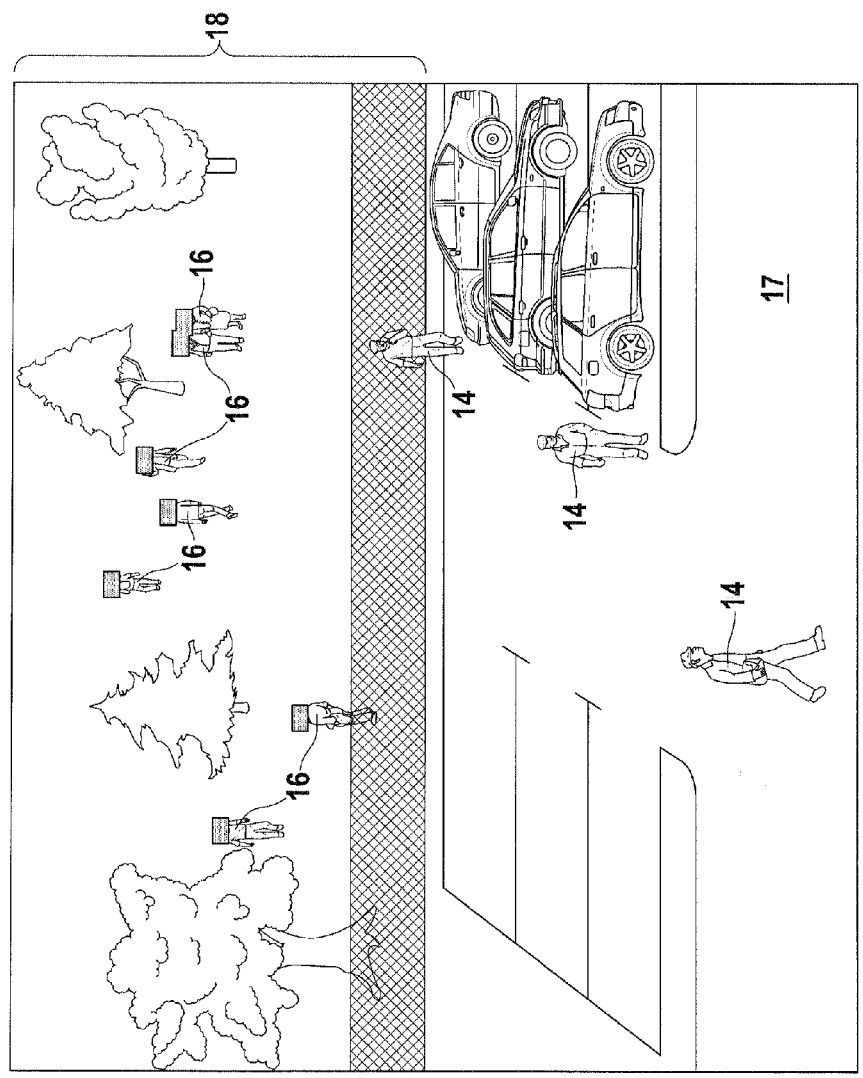
FIG. 3 a second exemplary scene to illustrate the mode of operation of the surveillance system depicted in FIG. 1.

FIG. 3 shows, in a schematicized depiction, the application of masking module 5 on a parking lot 17 located on company property. The only region to be observed is parking lot region 17, while privacy protection is ensured for public region 18 on the other side of the fence. Appropriate input can be obtained from depth chart device 6 or model device 7 to identify public region 18 as a masking region, thereby masking persons 16 in the masking region. Pedestrians 14 in parking lot region 17 are depicted as being demasked or masked, however.

What is claimed is:

1. A masking module (4) for a surveillance system (1) configured for observing surveillance regions containing moving objects (14, 16, comprising:
    at least one surveillance camera (2);
    a selection device for selecting objects as selected objects (16); and
    a model device (7) including a 3D model of a surveillance scene;
    wherein the masking module (4) limits the masking of objects (16) to at least one selected spacial subregion (15, 18) of the surveillance region, and controls the at least one camera to output an image data stream in which the selected objects (16) or subregions are maintained in a masked form,
    wherein the spacial subregion (15, 18) comprises at least one 3D object,
    wherein the at least one 3D object that forms the selected subregion (15, 18) is selected from the 3D model,
    wherein the masking module (4), or a part thereof, is situated decentrally in the at least one surveillance camera (2) to ensure that the at least one surveillance camera (2) outputs only image data streams that contain masked objects, and
    wherein the masking module (4) protects privacy in the selected spacial subregions by rendering selected objects unrecognizable, unidentifiable or both using the masking.

2. The masking module (4) according to claim 1, wherein the selected subregion (15, 18) is defined depending on the distance from the surveillance camera (2).

3. The masking module (4) according to claim 2, wherein a depth chart device (6) includes a depth chart of the surveillance scene, and wherein the spacial subregion (15, 18) is selected from the depth chart.

4. The masking module (4) according to claim 1, wherein a masking device (8) masks all objects (14, 16) in the observed surveillance region, or a subset thereof comprising only the selected objects (16).

5. The masking module (4) according to claim 4, wherein a demasking device (9) removes the masking from all masked objects (14, 16), a subset of the masked objects, or both from a complement (14) of the set of the selected objects (16).

6. The masking module (4) according to claim 5, wherein the demasking device (9) identifies the objects (14) to be demasked on the basis of the object behavior.

7. The masking module (4) according to claim 1, wherein the masking module (4), the masking device (8) or both is designed to perform key-protected (10) encoding of the objects (16) to be masked in the stream of image data.

8. The masking module (4) according to claim 4, wherein the key for the key-protected encoding is released only for the selected objects (16) or for a subset of the selected objects to be demasked.

9. A method comprising the steps of:
   masking moving objects in a video surveillance region using a masking module for a surveillance system for observing surveillance regions containing moving objects, the system comprising at least one surveillance camera a selection device for selecting objects as the selected objects and a model device including a 3D model of the surveillance scene,
   wherein the masking module is situated decentrally in the at least one surveillance camera outputs the selected objects or subregions thereof in a masked form and limits the masking of objects to at least one selected spacial subregion of the surveillance region;
   selecting the spacial subregion from the 3D model, wherein the spacial subregion comprises at least one 3D object; and
   outputting only the selected objects in the at least one selected spacial subregion in a masked form that renders the selected objects unrecognizable, unidentifiable or both in order to protect privacy in the selected spatial subregions.

10. A computer program product comprising program code means embodied in a non-transitory computer readable medium for carrying out all steps of the method according to claim 9 when the program code means is run on a computer, the masking module (4) or both.

11. A surveillance system (1) configured for observing surveillance regions containing moving objects (14, 16), comprising:
   at least one surveillance camera (2) including a masking module (4) for implementing a task of protecting privacy in spacial subregions of the surveillance regions by rendering selected objects unrecognizable and/or unidentifiable using masking; and
   a device configured for communicating with the masking module (4) to enable selecting objects as the selected objects;
   wherein the masking module (4) includes a masking device (8) for masking and a model device (7) including a 3D model of a surveillance scene;
   wherein the masking module (4) limits the masking to at least one selected spacial subregion of the surveillance region that comprises at least one 3D object and, outputs the selected objects or subregions thereof in a masked form,
   wherein the at least one 3D object that forms the selected subregion (15, 18) is selected from the 3D model,
   wherein the at least one surveillance camera (2) outputs only image data streams that contain masked objects, and
   wherein the masking module (4), or a part thereof, is situated decentrally in the at least one surveillance camera (2) to ensure that the at least one surveillance camera (2) outputs only image data streams that contain masked objects.

12. The surveillance system of claim 11, wherein the masking module (4) further comprises a memory (10) and wherein only the image data streams that contain masked objects are stored in memory (10).

13. The surveillance system of claim 11, wherein the masking module (4) further comprises a central unit (3) and wherein only the image data streams that contain masked objects are output to the central unit (3).

* * * * *